United States Patent [19]

Weder et al.

[11] Patent Number: 5,259,106
[45] Date of Patent: Nov. 9, 1993

[54] METHOD OF MAKING A FLOWER POT OR FLOWER POT COVER WITH PLEATED SKIRT

[75] Inventors: Donald E. Weder; Joseph G. Straeter, both of Highland, Ill.

[73] Assignee: Highland Supply Corporation, Highland, Ill.

[21] Appl. No.: 938,724

[22] Filed: Sep. 1, 1992

Related U.S. Application Data

[60] Continuation of Ser. No. 693,906, May 1, 1991, Pat. No. 5,181,339, which is a division of Ser. No. 397,114, Aug. 22, 1989, Pat. No. 5,029,412, which is a continuation-in-part of Ser. No. 366,588, Jun. 15, 1989, Pat. No. 5,111,613, which is a continuation-in-part of Ser. No. 219,083, Jul. 13, 1988, Pat. No. 4,897,031, which is a continuation of Ser. No. 4,275, Jan. 5, 1987, Pat. No. 4,773,182, which is a continuation of Ser. No. 613,080, May 22, 1984, abandoned.

[51] Int. Cl.$^5$ .............................................. B21D 35/00
[52] U.S. Cl. ...................................... 29/469.5; 47/72; 53/397; 156/217; 156/227
[58] Field of Search .............. 29/432, 450, 452, 469.5, 29/525; 47/66, 72; 53/397, 221, 580; 229/87.19; 206/423; 248/101; 215/100.5; 156/196, 210, 217, 221, 227

[56] References Cited

U.S. PATENT DOCUMENTS

| 239,987 | 4/1881 | Shellenberger | 281/34 |
|---|---|---|---|
| D. 254,659 | 4/1980 | Karotseris | D11/143 |
| D. 292,562 | 11/1987 | Weder et al. | D11/164 |
| D. 292,563 | 11/1987 | Weder et al. | D11/164 |
| D. 293,224 | 12/1987 | Weder et al. | D11/164 |
| D. 293,774 | 1/1988 | Weder et al. | D11/164 |
| D. 293,775 | 1/1988 | Weder et al. | D11/164 |
| 716,668 | 12/1902 | Cheney | 281/34 |
| 732,889 | 7/1903 | Paver | 281/34 |
| 923,663 | 6/1909 | Kroeger | 281/34 |
| 1,002,346 | 9/1911 | Weeks | 281/34 |
| 1,052,379 | 2/1913 | Ranken | 281/34 |
| 1,069,675 | 8/1913 | Claussen | 281/34 |
| 1,206,708 | 11/1916 | Hutchins | 281/34 |
| 1,421,027 | 6/1922 | Reynolds | 281/34 |
| 1,421,628 | 7/1922 | Watkins | 281/34 |
| 1,446,563 | 2/1923 | Hughes | 281/34 |
| 1,693,435 | 11/1928 | Clarke | 281/34 |
| 1,863,216 | 6/1932 | Wordingham | 281/34 |
| 1,868,853 | 7/1932 | Sievers | 281/34 |
| 1,920,533 | 8/1933 | Strauss | 281/34 |
| 1,924,926 | 8/1933 | Gray | 65/53 |
| 1,951,642 | 3/1934 | Augustin et al. | 47/34 |
| 1,978,631 | 10/1934 | Herrlinger | 91/68 |
| 1,979,771 | 11/1934 | Potter | 47/41 |
| 2,076,212 | 4/1937 | Suter et al. | 91/67.9 |
| 2,123,075 | 7/1938 | Langa | 47/34 |
| 2,152,648 | 4/1939 | Jones | 47/34 |
| 2,278,673 | 4/1942 | Savada et al. | 154/43 |

(List continued on next page.)

FOREIGN PATENT DOCUMENTS

163453  8/1985  European Pat. Off. .
2948265  5/1981  Fed. Rep. of Germany .

(List continued on next page.)

OTHER PUBLICATIONS

Exhibit A. Curtis Wagner Co., Inc., Houston, Tex., shows thick, stiff shiny red plastic pot cover with large scalloped border. (Photograph).

Exhibit B. Jacobson Pot Cover Company of Scranton, Pennsylvania advertising literature. Date of first use unknown.

(List continued on next page.)

Primary Examiner—Timothy V. Eley
Attorney, Agent, or Firm—Dunlap, Codding & Lee

[57] ABSTRACT

A flower pot or flower pot cover and method of making comprising a base and a skirt connected to an upper end of the base. The base includes a plurality of overlapping folds for providing structural integrity. The skirt includes a plurality of folds which are not connected to provide an overall pleated appearance. Portions of the folds in the skirt are connected and portions of the folds in the skirt are unconnected. In one embodiment, some of the folds in the base are connected and the remaining portions of the folds in the base are unconnected.

29 Claims, 4 Drawing Sheets

U.S. PATENT DOCUMENTS

| | | | |
|---|---|---|---|
| 2,302,259 | 11/1942 | Rothfuss | 41/10 |
| 2,355,559 | 8/1944 | Renner | 229/8 |
| 2,411,328 | 11/1946 | MacNab | 33/12 |
| 2,482,981 | 9/1949 | Kamrass | 41/13 |
| 2,510,120 | 6/1950 | Leander | 117/122 |
| 2,529,060 | 11/1950 | Trillich | 117/68.5 |
| 2,774,187 | 12/1956 | Smithers | 47/41 |
| 2,822,287 | 2/1958 | Avery | 117/14 |
| 2,827,217 | 3/1958 | Clement | 229/1.5 |
| 2,845,735 | 8/1958 | Werner | 41/10 |
| 2,942,823 | 6/1960 | Chapman | 248/97 |
| 2,967,652 | 1/1961 | Canfield | 229/5.5 |
| 3,013,689 | 12/1961 | Shropshire | 215/100.5 |
| 3,022,605 | 2/1962 | Reynolds | 47/58 |
| 3,094,810 | 6/1963 | Kalpin | 47/37 |
| 3,130,113 | 4/1964 | Silman | 161/97 |
| 3,271,922 | 9/1966 | Wallerstein et al. | 53/3 |
| 3,376,666 | 4/1968 | Leonard | 47/11 |
| 3,488,022 | 1/1970 | Vittori | 248/152 |
| 3,552,059 | 1/1971 | Moore | 47/41.12 |
| 3,554,434 | 1/1971 | Anderson | 229/55 |
| 3,620,366 | 11/1971 | Parkinson | 206/59 C |
| 3,681,105 | 8/1972 | Milutin et al. | 117/15 |
| 3,775,903 | 12/1973 | Pike | 47/37 |
| 3,869,828 | 3/1975 | Matsumoto | 47/34.11 |
| 3,962,503 | 6/1976 | Crawford | 428/40 |
| 3,974,960 | 8/1976 | Mitchell | 229/62 |
| 4,043,077 | 8/1977 | Stonehocker | 47/66 |
| 4,054,697 | 10/1977 | Reed et al. | 428/40 |
| 4,118,890 | 10/1978 | Shore | 47/28 R |
| 4,170,618 | 10/1979 | Adams | 264/101 |
| 4,216,620 | 8/1980 | Weder et al. | 47/72 |
| 4,250,664 | 2/1981 | Remke | 47/76 |
| 4,283,032 | 8/1981 | Smith | 248/97 |
| 4,297,811 | 11/1981 | Weder | 47/72 |
| 4,300,312 | 11/1981 | Weder et al. | 47/72 |
| 4,338,979 | 7/1982 | Dow | 141/10 |
| 4,340,146 | 7/1982 | Stratton | 215/100.5 |
| 4,380,564 | 4/1983 | Cancio et al. | 428/167 |
| 4,400,910 | 8/1983 | Koudstaal et al. | 47/84 |
| 4,413,725 | 11/1983 | Bruno et al. | 206/45.33 |
| 4,488,697 | 12/1984 | Garvey | 248/101 |
| 4,508,223 | 4/1985 | Catrambone | 206/423 |
| 4,621,733 | 11/1986 | Harris | 206/423 |
| 4,717,262 | 1/1988 | Roen et al. | 383/120 |
| 4,733,521 | 3/1988 | Weder et al. | 53/580 |
| 4,773,182 | 9/1988 | Weder et al. | 47/72 |
| 4,795,601 | 1/1989 | Cheng | 264/138 |
| 4,835,834 | 6/1989 | Weder et al. | 29/525 |

FOREIGN PATENT DOCUMENTS

| | | |
|---|---|---|
| 2036163 | 12/1970 | France . |
| 2272914 | 1/1976 | France . |
| 2489126 | 8/1980 | France . |
| 8101464 | 10/1982 | Netherlands . |
| 161005 | 6/1933 | Switzerland . |
| 274167 | 3/1951 | Switzerland . |
| 560532 | 4/1972 | Switzerland . |
| 28130 | of 1907 | United Kingdom . |
| 1204647 | 9/1970 | United Kingdom . |

OTHER PUBLICATIONS

Exhibit C. Photograph of pot cover, manufacturer unknown, but very similar to #C21 on Exhibit B (Jacobson literature).

Exhibit D. Photocopy of photo of pot cover ("Platform Pot Dresser") made by John Raisen Corp., San Francisco, Calif.

Exhibit E. Photograph of 2-part pot cover system made by Floral Decor, subsidiary of John Henry Co., Lansing, Mich.

Exhibit F. Photo of pot cover made by a Holland company (K.P.I.). Date of first public use believed to be late 1984.

Exhibit G. "The Glass of Frederick Carder", copyright 1971 by P. V. Gardner, showing various styles of glass basket-like vases or containers.

Exhibit H. "Speed Cover ®" brochure, published in 1983 by Applicants, showing various pot covers for sale.

Exhibit J. Item published in 1936 by Gellman Bros., Minneapolis, Minn. Shows an assortment of paper hats.

Exhibit K. Photo of various other flower pot wrappings, sold in rolls or sheets and used in the floral industry for years.

Exhibit L. Photo of pot cover made of woven straw-like material.

Exhibit M. Photo of basket-type pot cover used in the floral industry.

Exhibit N. "Speed Cover ®" brochure, published in 1984 by Applicants, showing various pot covers for sale.

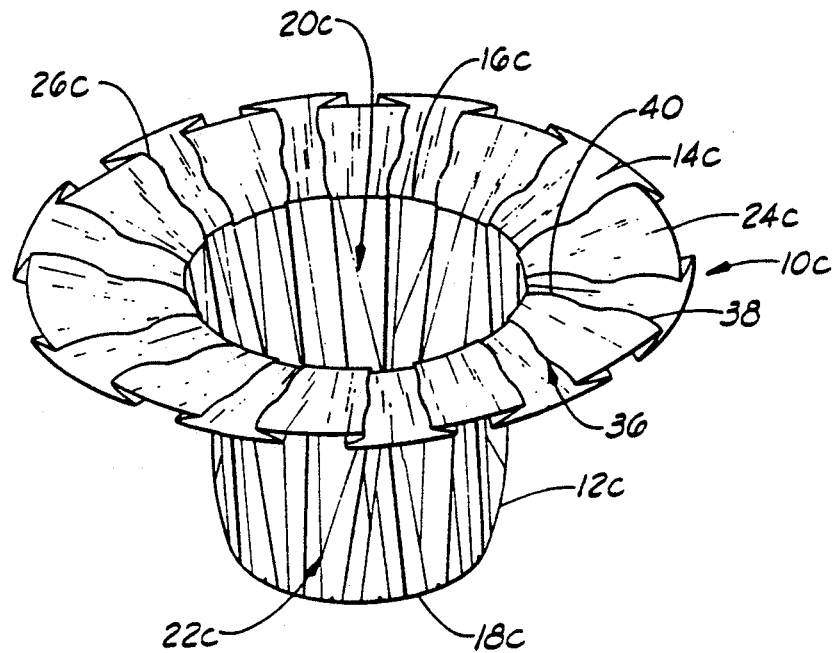
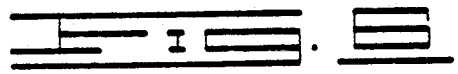
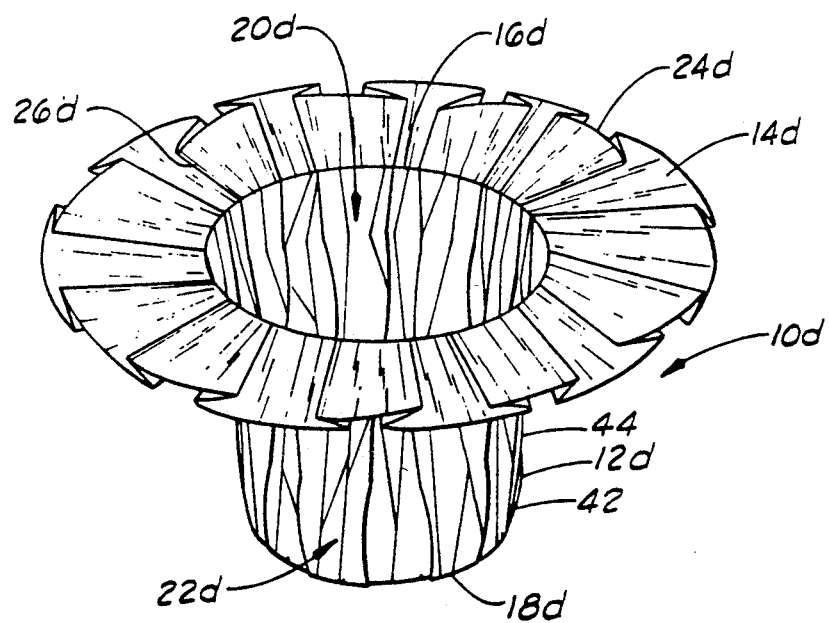
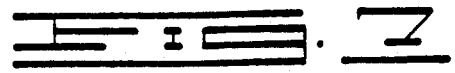

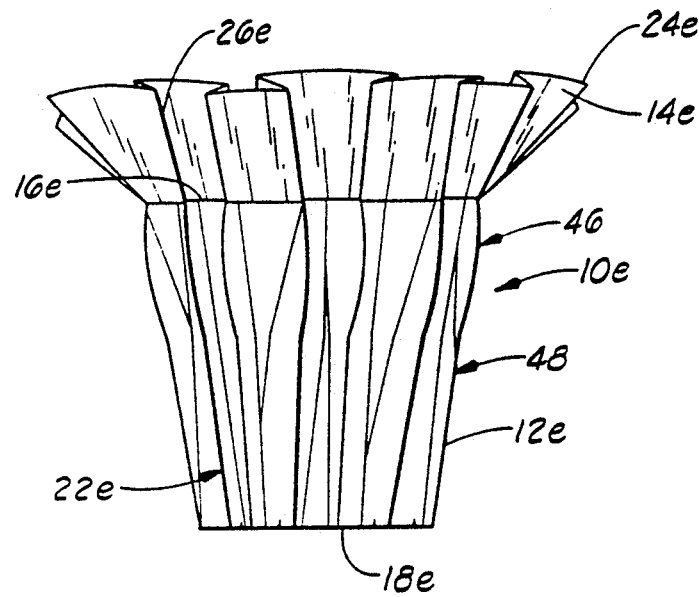
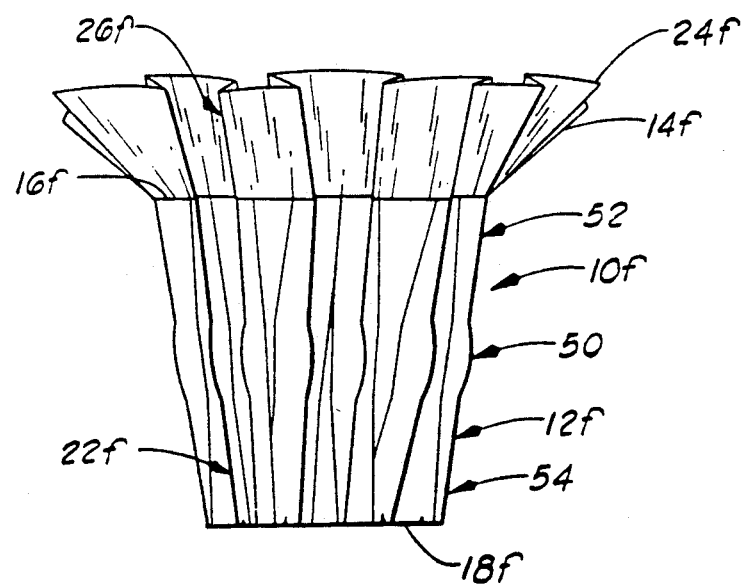

METHOD OF MAKING A FLOWER POT OR FLOWER POT COVER WITH PLEATED SKIRT

CROSS REFERENCE TO RELATED APPLICATIONS

This application is a continuation of U.S. Ser. No. 693,906, filed May 1, 1991, now U.S. Pat. No. 5,181,339 entitled "FLOWER POT OR FLOWER POT COVER WITH PLEATED SKIRT AND OR BASE", which is a Division of U.S. Ser. No. 397,114, filed Aug. 22, 1989, now U.S. Pat. No. 5,029,412; which is a continuation-in-part of U.S. Ser. No. 366,588, filed Jun. 15, 1989, now U.S. Pat. No. 5,111,613; which is a continuation-in-part of U.S. Ser. No. 219,083, filed Jul. 13, 1988, now U.S. Pat. No. 4,897,031; which is a continuation of U.S. Ser. No. 004,275, filed Jan. 5, 1987, now U.S. Pat. No. 4,773,182; which is a continuation of U.S. Ser. No. 613,080, filed May 22, 1984, now abandoned.

FIELD OF THE INVENTION

The present invention relates to flower pot covers or flower pots having skirts with folds in the skirt and a base with folds in the base wherein the folds in the skirt and/or in the base are selectively connected.

BRIEF DESCRIPTION OF THE DRAWINGS

FIG. 6 is a partial perspective view of a flower pot or flower pot cover with a portion of the folds in the skirt generally between the connection of the skirt to the base and the outer peripheral surface of the skirt being substantially permanently fixed.

FIG. 7 is a partial perspective view of a flower pot or flower pot cover with a portion of the folds in the base generally near the upper end of the base of being substantially permanently fixed and the remaining folds in the base being unconnected.

FIG. 8 is a side elevational view of a flower pot or flower pot cover with the folds in the base generally near the lower end being substantially permanently fixed and the folds in the base generally near the upper end being substantially unconnected.

FIG. 9 is a side elevational view of a flower pot or flower pot cover with folds in the base wherein the folds in the base generally near the upper end and generally near the lower end thereof are substantially permanently fixed and the folds at an intermediate position generally between the upper and the lower end portions of the base are substantially unconnected.

DESCRIPTION OF THE PREFERRED EMBODIMENTS

Figure 1:
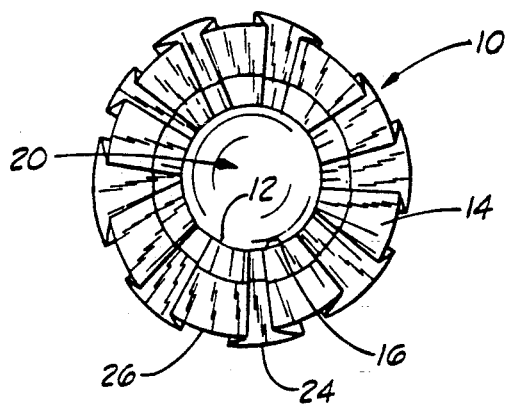
FIG. 1 is a top elevational view of the flower pot or flower pot cover constructed in accordance with the present invention.
Figure 2:
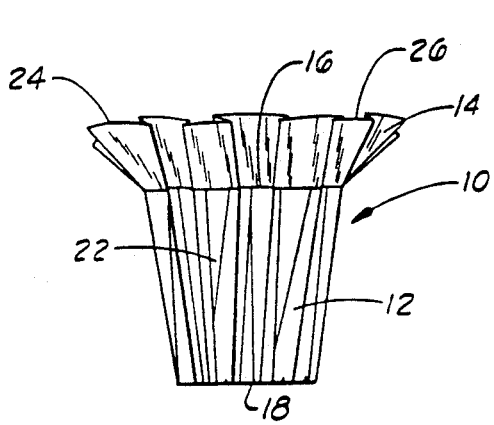
FIG. 2 is a side elevational view of the flower pot or flower pot cover of FIG. 1.
Figure 3:
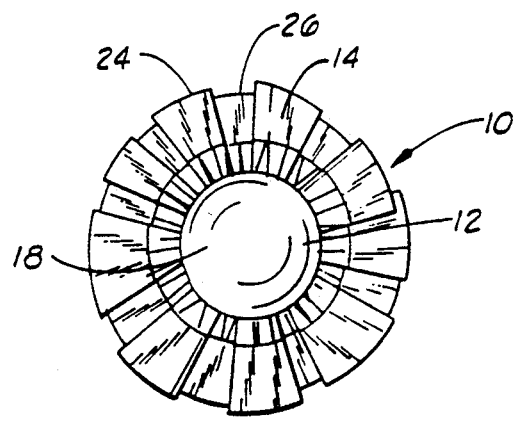
FIG. 3 is a bottom elevational view of the flower pot or flower pot cover of FIG. 1.

Shown in FIG. 1, 2 and 3 and designated therein by the reference numeral 10 is a flower pot or flower pot cover constructed in accordance with the present invention. In on embodiment, the article shown in the drawings is a flower pot cover which adapted for providing a decorative cover for a flower pot. In one other embodiment, the article shown in the drawings is a flower pot which is adapted to support floral groupings (defined below) in soil in a manner well known in the art.

The flower pot or flower pot cover 10 comprises a base 12 and a skirt 14.

The base 12 has an upper end 16 and a lower end 18. An object opening 20 (FIG. 1) is formed through the upper end 16 and the object opening 20 extends a distance through the base 12 with the base 12 substantially encompassing the object opening 20 except for the open upper end 16 of the base 12. The object opening 20 is the space substantially encompassed by the base 12.

The base 12 has a plurality of overlapping folds 22 (only one of the overlapping fold 22 being specifically designated by a reference numeral in FIG. 2) which extend at various angles and which have different and various lengths. The overlapping folds 22 in a preferred form are substantially fixed or connected. The overlapping folds 22 cooperate to provide structural integrity for maintaining the preformed shape of the base 12.

The skirt 14 is connected to the upper end 16 of the base 12. Preferably, the skirt 14 is formed integrally with the base 12. The skirt 14 extends outwardly from the upper end 16 of the base 12 terminating with an outer peripheral surface 24. A plurality of folds 26 (only one of the folds 26 being designated with a reference numeral in FIGS. 1 and 3) are formed in the skirt 14. Each of the folds 26 extends generally from the upper end 16 of the base 12 outwardly toward the outer peripheral surface 24 of the skirt 14. A substantial portion of the folds 26 are unconnected to provide an overall pleated appearance to the flower pot cover or flower pot 10.

The flower pot or flower pot cover 10 is formed by taking a sheet of material and disposing the sheet of material between a male and female mold. When the molds are brought together in mating engagement with the sheet of material therebetween the overlapping folds 22 are formed. The folds 22 can be substantially permanently connected or fixed by heat sealing the overlapping folds 22, or adhesively connecting the overlapping folds 22.

In a preferred form, the flower pot or flower pot cover 10 is preformed from a sheet of material in a manner substantially like that described in the patent entitled "Article Forming System", U.S. Pat. No. 4,773,182, issued on Sep. 27, 1988 and in the co-pending continuation patent application entitled "Article Forming System", U.S. Ser. No. 219,083, filed Jul. 13, 1988, referred to before. The disclosure in U.S. Pat. No. 4,773,172, specifically is incorporated herein by reference.

The flower pot or flower pot cover 10 may be constructed of a material selected from a group of materials consisting of a man-made organic polymer film, paper (treated or untreated or combinations thereof), burlap, cloth (natural or synthetic or combinations thereof), denim, foil, cling wrap, or cellophane or combinations thereof.

In one preferred embodiment, the flower pot or flower pot cover 10 is constructed from a relatively thin film of substantially non-shape sustaining man-made organic polymer film. The term "man-made organic polymer film" as used herein means a man-made resin such as a polyproplyene as opposed to naturally occurring resins such as cellophane A man-made organic polymer film is relatively strong and not as subject to tearing (substantially non-tearable), as might be the case with paper or foil. The man-made organic polymer film is a substantially linearly linked processed organic polymer film and is a synthetic linear chain organic polymer where the carbon atoms are substantially linearly linked Such films are synthetic polymers formed or synthesized from monomers. Further, a relatively substantially linearly linked processed organic polymer film is virtually waterproof which may be desirable in many applications such as wrapping a floral grouping.

Additionally a relatively thin film of substantially linearly linked processed organic polymer does not substantially deteriorate in sunlight. Processed organic polymer films having carbon atoms both linearly linked and cross linked, and some cross linked polymer films, also may be suitable for use in the present invention provided such films are substantially flexible and can be made in a sheet-like format for wrapping purposes consistent with the present invention.

The flower pot or flower pot cover 10 may be constructed of a single layer of material or a plurality of layers of the same or different types of material The flower pot or flower pot cover 10 may have any thickness. In one preferred embodiment, the flower pot or flower pot cover 10 is constructed from two polypropylene films laminated together (a 20"×15" sheet of Mobil 270 ABW white opaque film laminated to a 20"×15" sheet of Mobil 220 AB clear film). The flower pot or flower pot cover 10 preferably has a thickness in a range of from less than about 1.0 mil to about 2.5 mils, although the thickness of the flower pot or flower pot cover 10 may be in a range from less than about 1.0 mil to about 30 mils and preferably the thickness is less than about 6 mils.

The term "cling wrap" as used herein may be any material which is capable of connecting to flower pot 10 and/or itself upon contacting engagement and is wrappable about flower pot 10 whereby portions of the cling wrap contactingly engage and connect to other portions of the cling wrap and/or the flower pot 10 for generally securing the sheet of material 32 wrapped about at least a portion of the flower pot 10. This connecting engagement is generally temporary in that the cling wrap material may be easily removed without tearing same. Preferably the cling wrap material is constructed and treated if necessary, from polyethylene such as Cling Wrap made by GladN, First Brands Corporation, Danbury, Conn. Generally, the cling wrap material will range in thickness from less than about 0.2 mils to about 10 mils, and preferably less than about 0.5 mils to about 2.5 mils and most preferably from less than about 0.6 mils to about 2 mils. However, any thickness of cling wrap material may be utilized in accordance with the present invention which permits the cling material to function as previously described.

In a preferred form, a decorative pattern is formed or printed or embossed or otherwise disposed on or incorporated in the outer peripheral surface of the flower pot or flower pot cover 10. The term "decorative pattern" as used herein means a color and/or an embossed pattern and/or other decorative surface ornamentation, including, but not limited to printed designs, coatings, flocking or metallic finishes. The flower pot or flower pot cover 10 may be constructed of a sheet of material which is totally or partially clear or tinted transparent material. It also should be noted that a decorative pattern may be incorporated on the interior surface of the base 12 formed by the object opening 20 which may be desired in some applications.

The term "floral grouping" as used herein means cut fresh flowers, artificial flowers, other fresh and/or artificial plants or other floral materials and may include other secondary plants and/or ornamentation which add to the aesthetics of the overall floral grouping.

Figure 4:
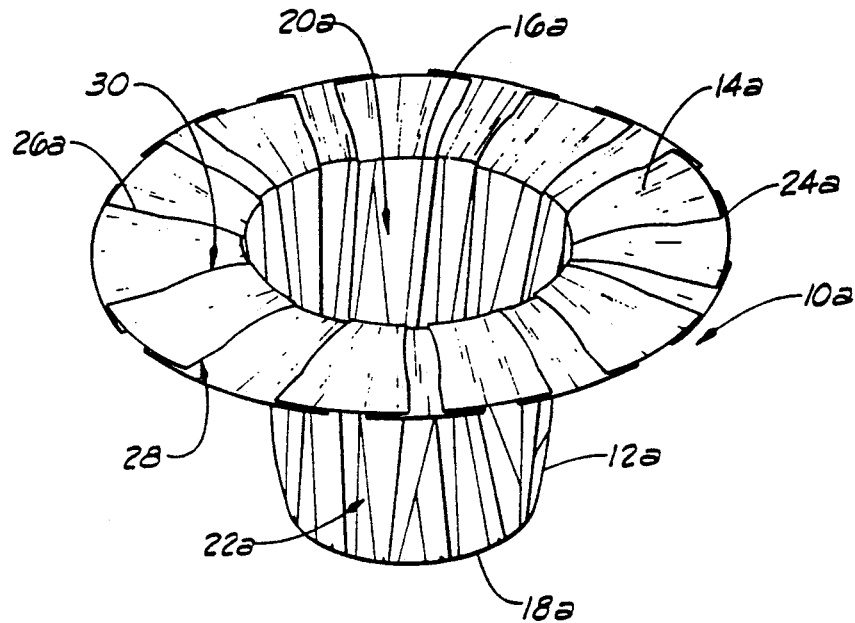
FIG. 4 is a partial perspective view of a flower pot or flower pot cover with a portion of the folds in the skirt near the outer peripheral surface of the skirt being substantially permanently fixed.

Embodiment of FIG. 4

Shown in FIG. 4 is a flower pot or flower pot cover 10a which is constructed exactly like the flower pot or flower pot cover 10 described in detail before, except a portion 28 of folds 26a generally near and spaced a distance from the outer peripheral surface 24a of the skirt 14a are connected or substantially permanently fixed forming connected folds with said portion 28 being disposed between the outer peripheral surface 24a of the skirt 14a and a position indicated by a line 29 in FIG. 4 spaced a distance from the outer peripheral surface 24a of the skirt 14a toward the upper end of the base 12a with said portion 29 extending circumferentially about the skirt 14a. A remaining portion 30 of the folds 26a in the skirt 14a between the upper end of the base 12a and the portion 28 having the connected folds are not connected or permanently fixed. The folds 26a in the skirt 14 which are connected or fixed may be connected or fixed by heat sealing or adhesively connecting.

Figure 5:
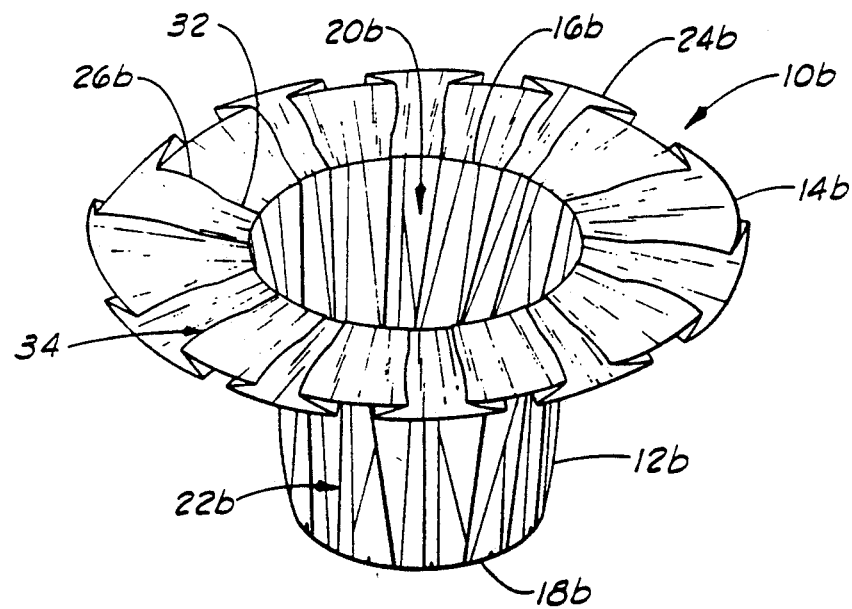
FIG. 5 is a partial perspective view of a flower pot or flower pot cover with a portion of the folds in the skirt near the connection of the skirt to base being substantially permanently fixed.

Embodiment of FIG. 5

Shown in FIG. 5 is a flower pot or flower pot cover 10b which is constructed exactly like the flower pot or flower pot cover 10 described in detail before, except a portion 32 of the folds 26b generally near and extending a distance from the connection of the skirt 14b to the upper end 16b of the base 12b are connected or substantially permanently fixed, said portion 32 being disposed between the upper end of the base 12b and a position indicated via a line 33 in FIG. 5 spaced a distance from the outer peripheral surface of the skirt 14b forming connected folds with said portion 32 extending circumferentially about the skirt 14b. A remaining portion 34 of the folds 26b in the skirt 14b are not connected or permanently fixed, said portion 34 being disposed between the outer peripheral surface 24b of the skirt 14b and the portion 32 with the connected folds.

Embodiment of FIG. 6

Shown in FIG. 6 is a flower pot or flower pot cover 10c which is constructed exactly like the flower pot or flower pot cover 10 described in detail before, except a portion 36 of the folds 26c at a position generally between the outer peripheral surface 24c and the connection of the skirt 14c to the upper end 16c of the base 16b are connected or substantially permanently fixed forming connected folds with said portion 36 having the connected folds extending circumferentially about the skirt 14c and with the dead portion 36 being disposed generally between lines 35 and 37 in FIG. 6. A remaining 38 of the folds 26c generally between the outer peripheral surface 24c and the portion 36 are not connected or substantially permanently fixed, said remaining portion 38 extending circumferentially about the skirt 14c. Another remaining portion 40 of the folds 26c generally between the connection of the skirt 14c to the upper end 16c of the base 12c and the portion 36 are not connected or substantially permanently fixed, said remaining portion 40 extending circumferentially about the skirt 14c.

The portions 28, 32 and 36 shown in FIGS. 4, 5 and 6, respectively, can be combined with each or some of the portions 28, 32 and 36 and the portions 28, 32 and 36 may extend only a partial distance circumferentially about the skirt 14c.

Embodiment of FIG. 7

Shown in FIG. 7 is a flower pot or flower pot cover 10d which is constructed exactly like the flower pot or flower pot cover 10 described in detail before, except a portion 42 of the folds 22d in the base 12d generally near the lower end 18d and extending a distance therefrom are not substantially permanently fixed or connected, said portion 42 being disposed between the lower end 18d and a line 43 in FIG. 7 and said portion 42 extending circumferentially about the base 12d. A remaining portion 44 of the folds 22d in the base 12d are substantially permanently fixed or connected, said remaining portion 44 extending between the line 43 and the upper end 16d of the base 12d and said remaining portion 44 extending circumferentially about the base 12d.

Embodiment of FIG. 8

Shown in FIG. 8 is a flower pot or flower pot cover 10e which is constructed exactly like the flower pot or flower pot cover 10 described in detail before, except portion 48 of the folds 22e and the base 12e disposed between the lower end 18e of the base 12e and a position indicated by a line 47 in FIG. 8 and spaced a distance from the lower end 18e of the base 12e toward the upper end 16e of the base 12e are permanently fixed or connected. A remaining portion 46 of the folds 22e in the base 12e between the upper end 16e and the portion 48 with the connected folds are unconnected or not substantially permanently fixed or connected. The portions 46 and 48 each extends circumferentially about the base 12e.

Embodiment of FIG. 9

Shown in FIG. 9 is a flower pot or flower pot cover 10f which is constructed exactly like the flower pot or flower pot cover 10 described in detail before, except a portion 50 of the folds 22f generally between the upper and lower ends 16f and 18f are not connected or permanently fixed, said portion 50 being disposed generally between lines 51 and 53 in FIG. 9 and said portion 50 extending circumferentially about the base 12f. A remaining portion 52 of the folds 22f generally between the portion 50 and the upper end 16f are substantially permanently connected or fixed, said remaining portion 52 extending circumferentially about the base 12f and said remaining portion 52 extending generally between the upper end 16f of the base 12f and the portion 50. Another remaining portion 54 generally between the portion 50 and the lower end 18f are substantially permanently connected or fixed, said remaining portion 54 extending circumferentially about the base 12f and said remaining portion 54 extending generally between the lower end 18f of the base 12f and the portion 50.

Changes may be made in the construction of the flower pot or flower pot cover 10 as described herein and changes may be made in the steps or the sequence of steps of the methods described herein without departing from the spirit and scope of the invention as defined in the following claims.

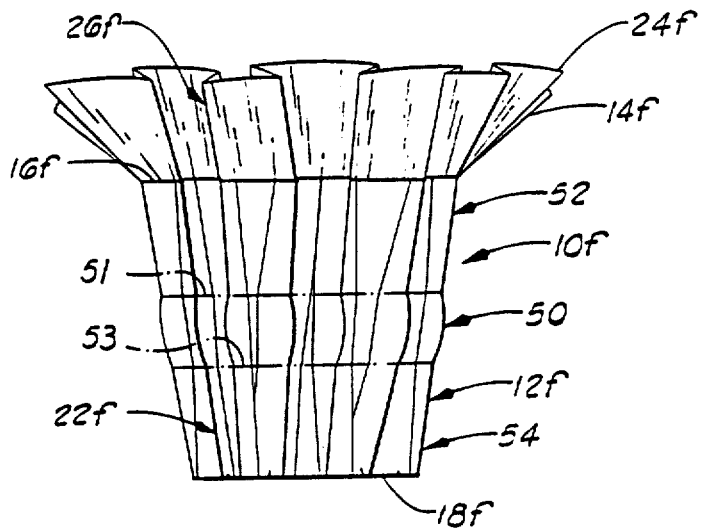

What is claimed is:

1. A method for making a flower pot or flower pot cover comprising:
    forming a base having an upper end and a lower end with an object opening extending through the upper end; and
    connecting a portion of overlapping folds in the base generally near the upper end of the base with said overlapping folds being connected forming connected folds and a remaining portion of the base between the lower end of the base and said portion of the base with the connected folds being substantially free of overlapping connected folds.

2. The method of claim 1 further comprising:
    forming a skirt connected to the upper end of the base and extending outwardly from the upper end of the base terminating with an outer peripheral surface.

3. A method for making a flower pot or flower pot cover, comprising:
    forming a base having an upper end and a lower end with an object opening extending through the upper end;
    forming a skirt connected to the upper end of the base and extending outwardly from the upper end of the base terminating with an outer peripheral surface, the skirt having a plurality of folds extending from about the upper end of the base outwardly toward the outer peripheral surface of the skirt; and
    connecting permanently a portion of the folds in the skirt between the upper end of the base and a position spaced a distance from the outer peripheral surface of the skirt toward the upper end of the skirt forming connected folds with said portion having the connected folds extending circumferentially about the skirt and a remaining portion of the folds in the skirt between the outer peripheral surface of the skirt and said portion with the connected folds being unconnected with said remaining portion extending circumferentially about the skirt.

4. The method of claim 3 wherein the flower pot cover is constructed of a material selected from a group of materials consisting of a man-made organic polymer film, paper treated or untreated or combinations thereof, burlap, cloth natural or synthetic or combinations thereof, denim, foil cling wrap, or cellophane or combinations thereof.

5. The method of claim 3 wherein the base and the skirt each are defined further as having a thickness in a range from less than about 1.0 mil to about 30 mils.

6. The method of claim 3 wherein the base and the skirt each are defined further as having a thickness of less than about 6 mils.

7. A method for making a flower pot or flower pot cover comprising:
    forming a base having an upper end and a lower end with an object opening extending through the upper end;
    forming a skirt connected to the upper end of the base and extending outwardly from the upper end of the base terminating with an outer peripheral surface, the skirt having a plurality of folds extending from about the upper end of the base outwardly toward the outer peripheral surface of the skirt; and connecting permanently a portion of the folds in the skirt between the outer peripheral surface of the skirt and a position spaced a distance from the outer peripheral surface of the skirt toward the upper end of the base forming connected folds with said portion having the connected folds extending circumferentially about the skirt and a remaining portion of the folds between the upper end of the base and said portion having the connected folds in the skirt being unconnected with said remaining portion extending circumferentially about the skirt.

8. The method of claim 7 wherein the flower pot cover is constructed of a material selected from a group of materials consisting of a man-made organic polymer film, paper treated or untreated or combinations thereof, burlap, cloth natural or synthetic or combinations thereof, denim, foil, cling wrap, or cellophane or combinations thereof.

9. The method of claim 7 wherein the base and the skirt each are defined further as having a thickness in a range from less than about 1.0 mil to about 30 mils.

10. The method of claim 7 wherein the base and the skirt each are defined further as having a thickness of less than about 6 mils.

11. A method for making a flower pot or flower pot cover comprising:

forming a base having an upper end and a lower end with an object opening extending through the upper end;

forming a skirt connected to the upper end of the base and extending outwardly from the upper end of the base terminating with an outer peripheral surface, the skirt having a plurality of folds extending from about the upper end of the base outwardly toward the outer peripheral surface of the skirt; and connecting substantially permanently a portion of the folds in the skirt generally between the outer peripheral surface of the skirt and the connection of the skirt to the upper end of the base forming connected folds with said portion having the connected folds extending circumferentially about the skirt, a remaining portion of the folds in the skirt between said portion having the connected folds and the outer peripheral surface of the skirt being unconnected with said remaining portion extending circumferentially about the skirt, and another remaining portion of the folds in the skirt between the upper end of the base and said portion having the connected folds being unconnected with said another remaining portion extending circumferentially about the base.

12. The method of claim 11 wherein the flower pot cover is constructed of a material selected from a group of materials consisting of a man-made organic polymer film, paper treated or untreated or combinations thereof, burlap, cloth natural or synthetic or combinations thereof, denim, foil, cling wrap, or cellophane or combinations thereof.

13. The method of claim 11 wherein the base and the skirt each are defined further as having a thickness in a range from less than about 1.0 mil to about 30 mils.

14. The method of claim 11 wherein the base and the skirt each are defined further as having a thickness of less than about 6 mils.

15. A method for making a flower pot or flower pot cover comprising:

forming a base having an upper end and a lower end with an object opening extending through the upper end and having a plurality of overlapping folds formed in the base for cooperating to provide structural integrity to the base; and connecting permanently a portion of the folds in the base between the lower end of the base and a position spaced a distance from the lower end of the base toward the upper end of the base forming connected folds with said portion having connected folds extending circumferentially about the base, and a remaining portion folds in the base between the upper end of the base and said portion having the connected folds being unconnected with said remaining portion extending circumferentially about the base.

16. The method of claim 15 further comprising:

forming a skirt connected to the upper end or the base and extending a distance generally outwardly from the upper end of the base.

17. The method of claim 15 wherein the flower pot cover is constructed of a material selected from a group of materials consisting of a man-made organic polymer film, paper treated or untreated or combinations thereof, burlap, cloth natural or synthetic or combinations thereof, denim, foil, cling wrap, or cellophane or combinations thereof.

18. The method of claim 15 wherein the base and the skirt each are defined further as having a thickness in a range from less than about 1.0 mil to about 30 mils.

19. The method of claim 15 wherein the base and the skirt each are defined further as having a thickness of less than about 6 mils.

20. A method for making a flower pot or flower pot cover comprising:

forming a base having an upper end and a lower end with an object opening extending through the upper end and having a plurality of overlapping folds formed in the base for cooperating to provide structural integrity to the base; and connecting permanently a portion of the folds in the base between the upper end of the base and a position spaced a distance from the upper end of the base forming connected folds with said portion having the connected folds extending circumferentially about the base and a remaining portion of the folds in the base between the lower end of the base and said portion having the connected folds being unconnected with said remaining portion extending circumferentially about the base.

21. The method of claim 20 further comprising:

forming a skirt connected to the upper end of the base and extending a distance generally outwardly from the upper end of the base.

22. The method of claim 20 wherein the flower pot cover is constructed of a material selected from a group of materials consisting of a man-made organic polymer film, paper treated or untreated or combinations thereof, burlap, cloth natural or synthetic or combinations thereof, denim, foil, cling wrap, or cellophane or combinations thereof.

23. The method of claim 20 wherein the base and the skirt each are defined further as having a thickness in a range from less than about 1.0 mil to about 30 mils.

24. The method of claim 20 wherein the base and the skirt each are defined further as having a thickness of less than about 6 mils.

25. A method for making a flower pot or flower pot cover comprising:
forming a base having an upper end and a lower end with an object opening extending through the upper end and having a plurality of overlapping folds formed in the base for cooperating to provide structural integrity to the base;
connecting permanently a portion of the folds in the base between the upper and lower ends of the base forming connected folds with said portion having connected folds extending circumferentially bout the base, and a remaining portion of the folds in the base between said portion having the connected folds and the upper end of the base being unconnected and said remaining portion extending circumferentially about the base, and another remaining portion of the folds in the base between said portion having the connected folds and the lower end of the base being unconnected and said another remaining portion extending circumferentially about the base.

26. The method of claim 25 further comprising:
forming a skirt connected to the upper end of the base and extending a distance generally outwardly from the upper end of the base.

27. The method of claim 25 wherein the flower pot cover is constructed of a material selected from a group of materials consisting of a man-made organic polymer film, paper treated or untreated or combinations thereof, burlap, cloth natural or synthetic or combinations thereof, denim, foil, cling wrap, or cellophane or combinations thereof.

28. The method of claim 25 wherein the base and the skirt each are defined further as having a thickness in a range from less than about 1.0 mil to about 30 mils.

29. The method of claim 25 wherein the base and the skirt each are defined further as having a thickness of less than about 6 mils.

* * * * *

UNITED STATES PATENT AND TRADEMARK OFFICE
CERTIFICATE OF CORRECTION

PATENT NO. : 5,259,106
DATED : November 9, 1993
INVENTOR(S) : Weder, et al

It is certified that error appears in the above-indentified patent and that said Letters Patent is hereby corrected as shown below:

Delete the title page and replace with the attached.

Column 2, line 58, please delete the word "co-pending".
Column 2, line 60, after the year "1988", please insert --now U.S. Pat. No. 4,897,031--.
Column 3, line 9, after the word "cellophane", please insert a --.--.
Column 3, line 32, after the word "material", please insert a --.--.
Column 4, line 35, please delete the number "14", and substitute therefore the number -- 14a --.
Column 4, line 63, please delete the number "16b" and substitute therefore the number --12c--.

Signed and Sealed this

Third Day of January, 1995

Attest:

BRUCE LEHMAN

*Attesting Officer*  *Commissioner of Patents and Trademarks*

United States Patent [19]

Weder et al.

[11] Patent Number: 5,259,106

[45] Date of Patent: Nov. 9, 1993

[54] METHOD OF MAKING A FLOWER POT OR FLOWER POT COVER WITH PLEATED SKIRT

[75] Inventors: Donald E. Weder; Joseph G. Straeter, both of Highland, Ill.

[73] Assignee: Highland Supply Corporation, Highland, Ill.

[21] Appl. No.: 938,724

[22] Filed: Sep. 1, 1992

Related U.S. Application Data

[60] Continuation of Ser. No. 693,906, May 1, 1991, Pat. No. 5,181,339, which is a division of Ser. No. 397,114, Aug. 22, 1989, Pat. No. 5,029,412, which is a continuation-in-part of Ser. No. 366,588, Jun. 15, 1989, Pat. No. 5,111,613, which is a continuation-in-part of Ser. No. 219,083, Jul. 13, 1988, Pat. No. 4,897,031, which is a continuation of Ser. No. 4,275, Jan. 5, 1987, Pat. No. 4,773,182, which is a continuation of Ser. No. 613,080, May 22, 1984, abandoned.

[51] Int. Cl.⁵ .............................................. B21D 35/00
[52] U.S. Cl. ...................................... 29/469.5; 47/72; 53/397; 156/217; 156/227
[58] Field of Search ............. 29/432, 450, 452, 469.5, 29/525, 47/66, 72; 53/397, 221, 580; 229/87.19; 206/423; 248/101; 215/100.5; 156/196, 210, 217, 221, 227

[56] References Cited

U.S. PATENT DOCUMENTS

| | | | |
|---|---|---|---|
| 239,987 | 4/1881 | Shellenberger | 281/34 |
| D. 254,659 | 4/1980 | Karotsens | D11/143 |
| D. 292,562 | 11/1987 | Weder et al. | D11/164 |
| D. 292,563 | 11/1987 | Weder et al. | D11/164 |
| D. 293,224 | 12/1987 | Weder et al. | D11/164 |
| D. 293,774 | 1/1988 | Weder et al. | D11/164 |
| D. 293,775 | 1/1988 | Weder et al. | D11/164 |
| 716,668 | 12/1902 | Cheney | 281/34 |
| 732,889 | 7/1903 | Paver | 281/34 |
| 923,663 | 6/1909 | Kroeger | 281/34 |
| 1,002,346 | 9/1911 | Weeks | 281/34 |
| 1,052,379 | 2/1913 | Ranken | 281/34 |
| 1,069,675 | 8/1913 | Claussen | 281/34 |
| 1,206,708 | 11/1916 | Hutchins | 281/34 |
| 1,421,027 | 6/1922 | Reynolds | 281/34 |
| 1,421,628 | 7/1922 | Watkins | 281/34 |
| 1,446,563 | 2/1923 | Hughes | 281/34 |
| 1,693,435 | 11/1928 | Clarke | 281/34 |
| 1,863,216 | 6/1932 | Wordingham | 281/34 |
| 1,868,853 | 7/1932 | Sievers | 281/34 |
| 1,920,533 | 8/1933 | Strauss | 281/34 |
| 1,924,926 | 8/1933 | Gray | 65/53 |
| 1,951,642 | 3/1934 | Augustin et al. | 47/34 |
| 1,978,631 | 10/1934 | Herrlinger | 91/68 |
| 1,979,771 | 11/1934 | Potter | 47/41 |
| 2,076,212 | 4/1937 | Suter et al. | 91/67.9 |
| 2,123,075 | 7/1938 | Langa | 47/34 |
| 2,152,648 | 4/1939 | Jones | 47/34 |
| 2,278,673 | 4/1942 | Savada et al. | 154/43 |

(List continued on next page.)

FOREIGN PATENT DOCUMENTS

| | | |
|---|---|---|
| 163453 | 8/1985 | European Pat. Off. |
| 2948265 | 5/1981 | Fed. Rep. of Germany |

(List continued on next page.)

OTHER PUBLICATIONS

Exhibit A. Curtis Wagner Co., Inc., Houston, Tex., shows thick, stiff shiny red plastic pot cover with large scalloped border. (Photograph).

Exhibit B. Jacobson Pot Cover Company of Scranton, Pennsylvania advertising literature. Date of first use unknown.

(List continued on next page.)

Primary Examiner—Timothy V. Eley
Attorney, Agent, or Firm—Dunlap, Codding & Lee

[57] ABSTRACT

A flower pot or flower pot cover and method of making comprising a base and a skirt connected to an upper end of the base. The base includes a plurality of overlapping folds for providing structural integrity. The skirt includes a plurality of folds which are not connected to provide an overall pleated appearance. Portions of the folds in the skirt are connected and portions of the folds in the skirt are unconnected. In one embodiment, some of the folds in the base are connected and the remaining portions of the folds in the base are unconnected.

29 Claims, 4 Drawing Sheets

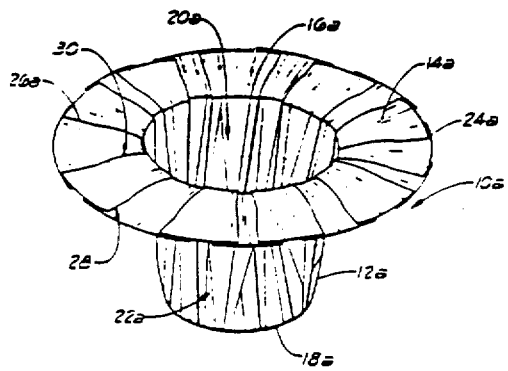

UNITED STATES PATENT AND TRADEMARK OFFICE
CERTIFICATE OF CORRECTION

PATENT NO. : 5,259,106

DATED : November 9, 1993

INVENTOR(S) : Weder et al.

It is certified that error appears in the above-identified patent and that said Letters Patent is hereby corrected as shown below:

Sheet 2 of 4, please delete the drawing for "Figure 4", and substitute therefore the new drawing for --Figure 4--.

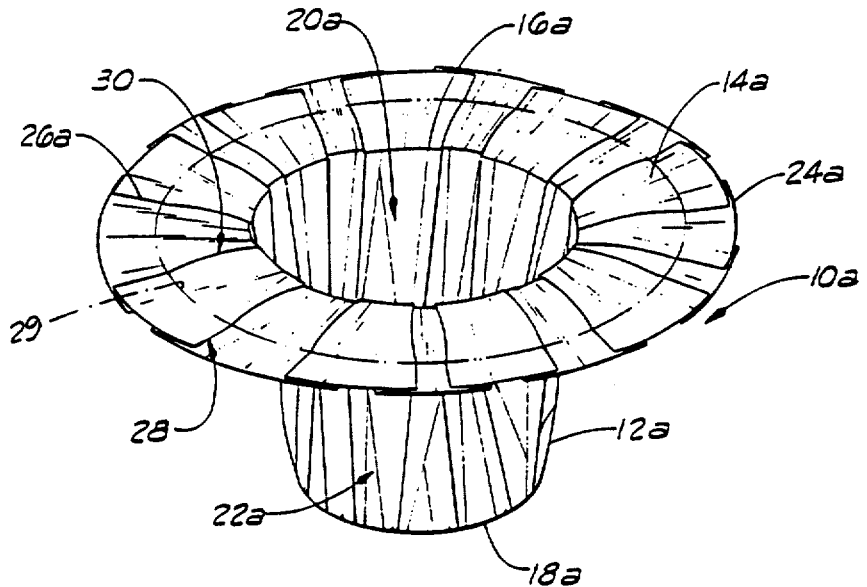

FIG. 4

UNITED STATES PATENT AND TRADEMARK OFFICE
CERTIFICATE OF CORRECTION

PATENT NO. : 5,259,106  Page 4 of 7

DATED : November 9, 1993

INVENTOR(S) : Weder et al.

It is certified that error appears in the above-identified patent and that said Letters Patent is hereby corrected as shown below:

Sheet 2 of 4, please delete the drawing for "Figure 5", and substitute therefore the new drawing for --Figure 5--.

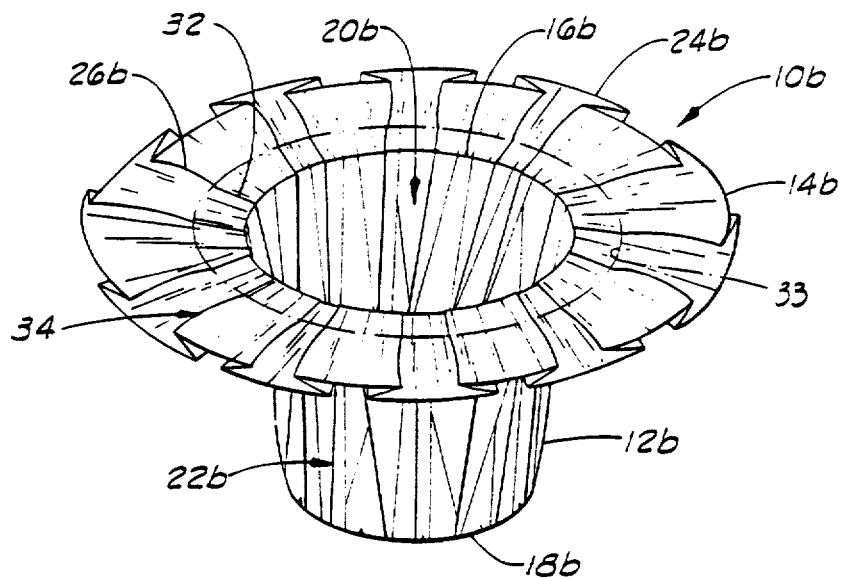

FIG. 5

UNITED STATES PATENT AND TRADEMARK OFFICE
CERTIFICATE OF CORRECTION

PATENT NO. : 5,259,106

DATED : November 9, 1993

INVENTOR(S) : Weder et al.

It is certified that error appears in the above-identified patent and that said Letters Patent is hereby corrected as shown below:

Sheet 3 of 4, please delete the drawing for "Figure 7", and substitute therefore the new drawing for --Figure 7--.

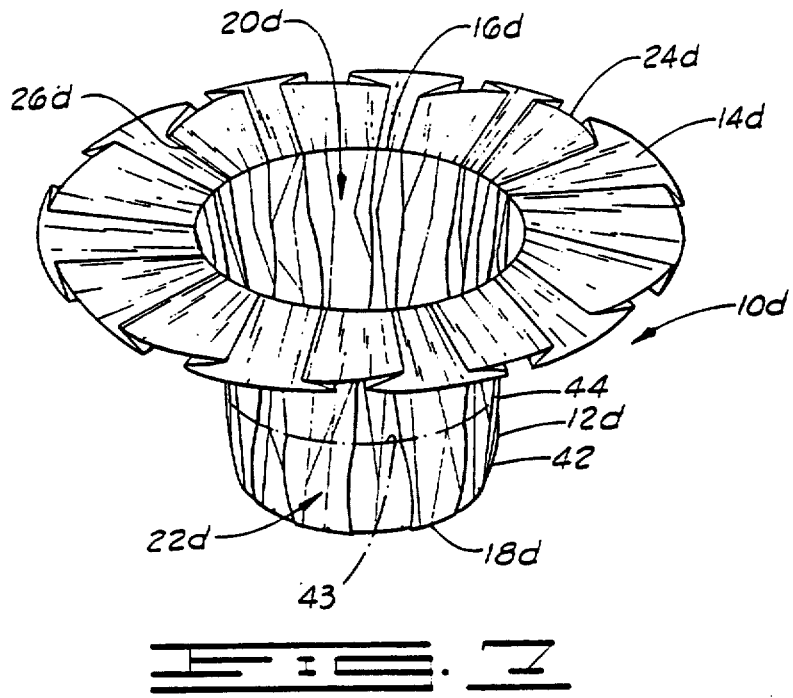

FIG. 7

UNITED STATES PATENT AND TRADEMARK OFFICE
CERTIFICATE OF CORRECTION

PATENT NO. : 5,259,106

DATED : November 9, 1993

INVENTOR(S) : Weder et al.

It is certified that error appears in the above-identified patent and that said Letters Patent is hereby corrected as shown below:

Sheet 4 of 4, please delete the drawing for "Figure 8", and substitute therefore the new drawing for --Figure 8--.

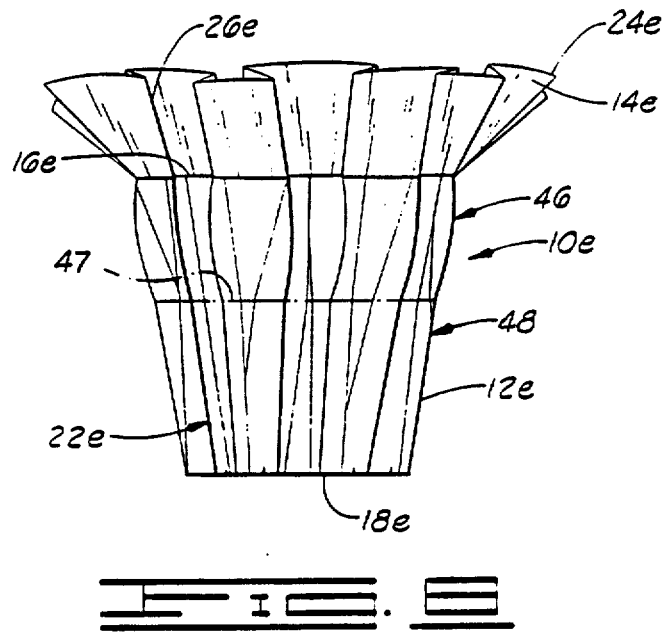

FIG. 8

UNITED STATES PATENT AND TRADEMARK OFFICE
CERTIFICATE OF CORRECTION

PATENT NO. : 5,259,106

DATED : November 9, 1993

INVENTOR(S) : Weder et al.

It is certified that error appears in the above-identified patent and that said Letters Patent is hereby corrected as shown below:

Sheet 4 of 4, please delete the drawing for "Figure 9", and substitute therefore the new drawing for --Figure 9--.